Dec. 3, 1935.  E. STELLA  2,023,153
FLUID OPERATED VALVE FOR FERMENTATION RECEPTACLES
Filed July 21, 1934
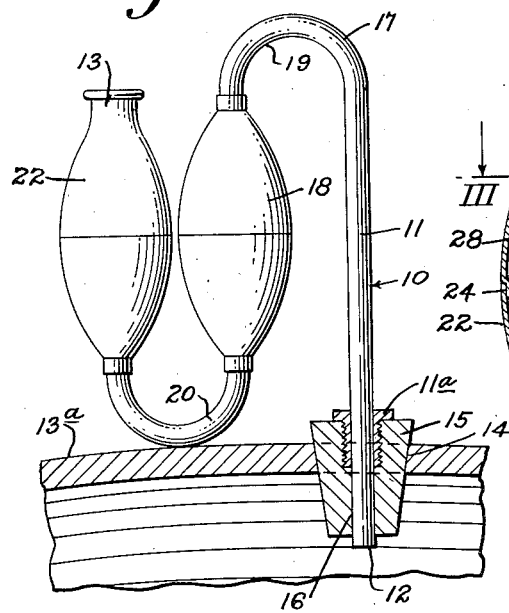
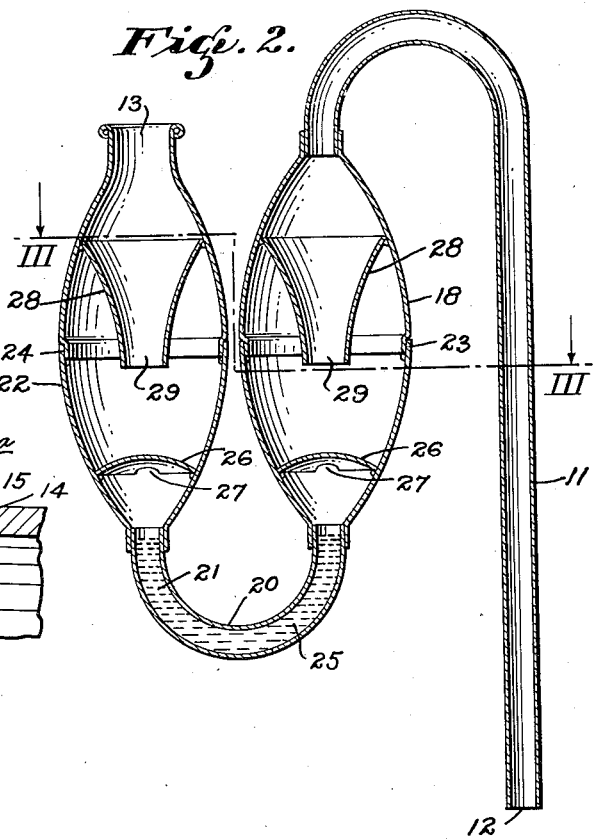
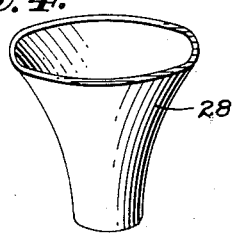
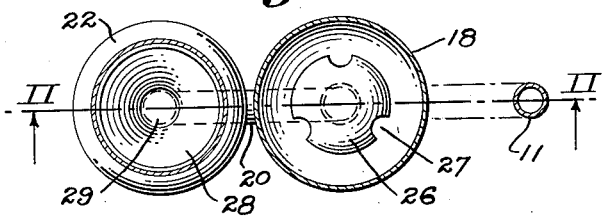
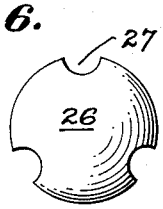
INVENTOR.
Emidio Stella.
BY
ATTORNEY Patented Dec. 3, 1935

2,023,153

UNITED STATES PATENT OFFICE 2,023,153

FLUID OPERATED VALVE FOR FERMENTATION RECEPTACLES

Emidio Stella, San Francisco, Calif., assignor of one-half to Marino De Lorenzo

Application July 21, 1934, Serial No. 736,364

3 Claims. (Cl. 217—105)

This invention relates to fluid-operated valves for fermentation receptacles and particularly that type of valve which is used in kegs, vats, and other receptacles which contain a commodity which may, in the treatment thereof, give off a gaseous fluid and which commodity in its further treatment or utilization may require that a gaseous fluid be taken into the receptacle. An example of the use of the apparatus may well be illustrated in connection with a receptacle for the fermentation of wines, although the device is adapted for use under many other circumstances where it is desirable or necessary normally to have a seal against free entry of air into the receptacle and at the same time provide for an automatic exhaust of gaseous fluid from the receptacle and also the entry of air into the receptacle. Devices of this character are sometimes referred to as "breathers" and sometimes as liquid seals.

An object of this invention is to provide an apparatus for sealing casks and the like in a manner wherein the contents of the cask are normally sealed against atmospheric contact, but which is subject to automatic control so that gaseous fluid may flow from or into the cask responsive to gaseous pressure in the cask in relation to atmospheric pressure outside of the cask. Another object is to provide an apparatus which is adaptable for the above purposes and which has a liquid seal and means to maintain the liquid against flow from the device. A still further object is to provide a continuously tubular device of retroverted loops in which a heavy liquid medium may be maintained in one of the looped portions. A still further object is to provide an apparatus of the above mentioned type in which means are provided for preventing a fluid sealing medium from inadvertent flow from the apparatus, and further, to generally improve upon devices of the character herein described.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims, without departing from the spirit or sacrificing any of the advantages of the invention.

To more clearly comprehend the invention, reference is directed to the accompanying drawing, wherein:—

Fig. 1 is a side elevational view of the invention shown in operative position in connection with a cask, the latter of which is fragmentarily shown partly in section.

Fig. 2 is a vertical transverse section on line II—II of Fig. 3.

Fig. 3 is a horizontal sectional view on line III—III of Fig. 2.

Fig. 4 is a perspective of trapping device in detail.

Fig. 5 is a horizontal side elevation of vent plate.

Fig. 6 is a plan view of vent plate.

Referring to the drawing wherein like characters of reference designate corresponding parts, 10 illustrates generally an S shaped continuously tubular member which at one end portion provides a neck 11 the open end 12 of which is adapted for penetrating through the wall of a container which, in this exemplification, is illustrated as a container 13ª having a filling opening 14 closed by a bung or cork 15 which has an opening 16 therethrough which snugly fits around the end portion of the neck member 11. Means such as threaded nut 11ª may be used to fixedly and securely connect the neck 11 within the opening 16. The neck member is retroverted upon itself as at 17 providing a first retroverted portion 18 and a tubular loop 19, the tubular member being again retroverted upon itself as at 20 to form a second loop 21 and a second retroverted portion 22, the portion 20 providing a connecting tubular conduit. This structure, as described, forms the S shaped member having an exaggerated ogee shape which terminates at one end in opening 12 and at the other end in an opening 13. It is preferred that the retroverted portions 18 and 22 shall be bulbous and that each be formed of ellipsoidal sections which are connected together by any suitable means such as a lock-seam at the portions indicated 23 and 24. Within the connecting conduit portion 20 interposed between the bulbous portions 18 and 22 is provided a fluid medium 25. This fluid medium may be any substance which will normally seal the tubular connecting conduit 20 against unrestricted passage therethrough of gases of fermentation from the cask and also against unrestricted passage through the tube of atmospheric air into the cask. Numerous liquids may be used for that purpose such as water, olive oil or vegetable oil, or refined mineral oil, but from experiments it has been ascertained that fluid mercury or quick silver serves the purpose admirably well, does not evaporate or accumulate dirt, and because of its inherent weight serves to resist the unrestricted passage of gas through the tubular conduit connecting member.

At the lower portion of each of the bulbous members there is provided a baffle 26 having vents or openings 27 therein, it being preferred that the baffle be convex upwardly with relation to the bottom of the bulbous members. At the opposite end portion there is provided a liquid trap 28 which, in the present exemplification, consists of a hollow inverted truncated conical member. The members 28 and 26 are fixedly secured within the bulbous members before the ellipsoidal sections are fixedly connected at the seams or interlocks 23 and 24.

In describing the operation of the apparatus it is believed sufficient to state in a general way only that while the apparatus may be used for various purposes the illustration herein is in connection with a cask containing fermentitious liquid such as fruit juice in the process of making wine. The bung or cork 15 tightly seals the cask and the neck 11 tightly fits within the opening 16 so that the only line of egress for accumulating gases within the cask is through the tubular apparatus herein described. As the gases of fermentation increase within the cask a pressure is engendered which is sufficient to force the continuously accumulating gases through the neck 11, the opening 29 of the hollow cone 28, through the openings 27 of the baffle plate, and through the liquid 25, from whence it discharges through the openings 27 and 29 of the second bulbous member and from thence to the atmosphere through the opening 13. When it is desired to withdraw any portion of the fermenting liquid from the cask, a pressure less than atmospheric is created within the cask and the liquid or wine cannot be freely withdrawn unless atmospheric air has ingress into the cask. During the withdrawal of wine from the cask air may enter the opening 13 and flow in the reverse direction responsive to suction within the cask. When the gases of fermentation accumulate so as to build up a pressure the escape of those gases through the apparatus may be by a sudden breaking through of the liquid in the connecting conduit 20 and in order that the liquid may not be blown out of the apparatus the convex baffle is provided and any liquid blown against the under side of this baffle is thus turned back into the well of the connecting portion 20. Any liquid which passes through the opening 27 will be prevented from egress from the bulbous portions by the liquid trap 28, the opening of which at 29 overlies a closed portion of the baffle 26 and such liquid may readily flow back into the well of the connecting conduit 20 through the openings 27. In case it is desirable to remove the apparatus from the cask and place it in a horizontal plane, the liquid may flow into the bulbous portions between the baffle 26 and the trap 28 but will not escape beyond the liquid trap due to the conical shape of the trap 28 which spaces the opening 29 from the inner side walls of the bulbous portions. Upon repositioning the apparatus in a cask the liquid will again flow into the well of portion 20 through openings 27.

Having thus described my invention, what I claim and desire to secure by Letters Patent of the United States is:—

1. A device of the character described comprising a pair of substantially parallel bulbous shaped tubular members, a retroverted conduit member connectingly interposed between the corresponding respective ends of said pair of tubular members, one extreme end of the connected tubular members being open to normal atmospheric conditions and the other extreme end having a tubular conduit for connecting the tubular members to a fermentation receptacle, and means in said respective bulbous shaped members adapted for maintaining a liquid in said interposed conduit member against flow beyond the confines of the bulbous members, said last mentioned means including a relatively spaced liquid trap and a baffle each having an opening therein through which a gaseous fluid may flow in either direction, said baffle being adjacent the end of the tubular members which are relatively connected, and the liquid trap being adjacent the opposite end thereof, said baffle and liquid trap being in spaced relation axially of the respective tubular members.

2. A device of the character described comprising a pair of substantially parallel tubular members, a retroverted intermediate conduit member connectingly interposed between the corresponding respective ends of said pair of tubular members, one extreme end of the connected tubular members being open to normal atmospheric conditions and the other extreme end having a retroverted tubular conduit for connecting the tubular members to a fermentation receptacle, a baffle in each tubular member adjacent the ends thereof which are connected to the intermediate retroverted member, and a liquid trap in each tubular member adjacent its opposite end, said respective baffles and liquid traps each having an opening therein through which a gaseous fluid may flow in either direction, the opening in opposed baffles and traps being relatively offset from alignment.

3. A device of the character described comprising a pair of tubular members, a retroverted conduit member connectively interposed between the corresponding respective ends of said pair of tubular members for holding a supply of liquid, one extreme end of the connected tubular members being open to normal atmospheric conditions and the other extreme end having a retroverted tubular conduit for connecting the tubular members to a fermentation receptacle, and means in each of said tubular members for maintaining liquid in said interposed connecting conduit member against flow beyond the confines of the tubular member, said last mentioned means including in each of said tubular members, a baffle at the end adjacent the retroverted member which connects the two tubular members, and a liquid trap at the other end of each of the tubular members, said baffle and liquid trap each having an opening therethrough, the opening in the baffle providing a passageway from the lower end of the respective tubular members into the conduit which connects the ends of the tubular members which are lowermost when the apparatus is mounted in operative relation to a fermentation receptacle and the tubular members are substantially vertical.

EMIDIO STELLA.